United States Patent Office 3,629,214
Patented Dec. 21, 1971

3,629,214
PROCESS FOR THE COPOLYMERIZATION OF VINYLTRIALKOXYSILANES
Robert Buning, Oberlar, and Hans-Joachim Kotzsch, Rheinfelden, Germany, assignors to Dynamit Nobel Aktiengesellschaft, Troisdorf, Germany
No Drawing. Filed Sept. 5, 1968, Ser. No. 758,194
Claims priority, application Germany, Sept. 8, 1967, D 54,067
Int. Cl. C08f 15/02
U.S. Cl. 260—85.5   12 Claims

ABSTRACT OF THE DISCLOSURE

Process for the preparation of copolymers of vinyltrialkoxylsilanes with other suitable monomers comprising contacting a vinyltri-tert.-alkoxy silane having the formula:

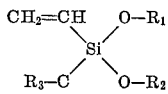

wherein $R_1$, $R_2$ and $R_3$ each represent tertiary alkyl of the formula:

wherein A, B and D are each alkyl, with another monomer copolymerizable therewith under polymerization conditions.

The resultant novel copolymers are free of crosslinking, are characterized by Si—C bonds which are interconnected by C—C bonds. They are thermoplastic and can be easily worked in extruders, deep drawing machines, rolling mills, etc.

---

This invention relates to a process for the copolymerization of vinyltrialkoxysilanes and to the resultant copolymers.

The copolymerization of vinyltrialkoxysilanes is in the prior art. Thus, for example, in U.S. Pat. 2,983,719, there is described a process for the polymerization of vinyltriethoxysilane with ethylacrylate. This copolymerization, if carried out in the aqueous phase, results in the side-reactions which give rise to cross-linked copolymers. In the absence of water, such side-reactions do not occur, however, in this case a subsequent cross-linking can occur as for example, when the products are being further worked and there is access to atmospheric moisture, this giving rise to considerable difficulty in the further working and to a final product having unsatisfactory properties. The degree to which these copolymers are cross-linked depends, of course, on the percentage of vinyltrialkoxysilanes in the copolymer. Experiments have shown that even when there is a relatively small percentage of vinyltrialkoxysilane in the copolymers, a considerable amount of cross-linking occurs.

In the copolymerization of 10% vinyltrimethoxysilane with 90% vinyl chloride in suspension (see the standard procedure as described below), a largely cross-linked copolymer is produced which contains only a small percentage of non-cross-linked polymer. The cross-linked copolymer thus obtained is insoluble, and because it is cross-linked, scarcely swellable, in tetrahydrofuran, a good solvent for polyvinylchloride. The soluble polymer consists of pure polyvinylchloride. This clearly establishes that a cross-linking polymerization takes place whenever vinyltrialkoxysilane participates in the copolymerization. Cross-linked polymers are difficult to work, and particularly so when the degree of cross-linking is very high.

In accordance with the invention, it has now been found that the above-described cross-linking side-reactions can be prevented entirely, in suspension, emulsion, and solution polymerization reactions conducted in the presence of water, if the copolymerization is carried out utilizing as the vinyltrialkoxysilane component a vinyl-tri-tert.-alkoxysilane of the following formula:

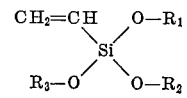

wherein $R_1$, $R_2$ and $R_3$ are tertiary alkyl which may be the same or different, of the formula:

wherein A, B and D are each alkyl, such as $CH_3-$, $C_2H_5-$, $C_3H_7-$, $C_4H_9$, $C_8H_{17}-$ and the like, which can be the same or different. The tertiary alkyl groups are preferably selected so as to have a total of 4 to 16 carbon atoms.

According to the invention, the vinyltritert.-alkoxy silanes are used in quantities of 0.1 to 10% by weight, and preferably in quantities of 0.5 to 5% of the weight of the monomer mixture.

In the process of the invention, the above-described undesirable side reactions do not take place. When the vinylsiloxanes of the invention are copolymerized with any of a large variety of monomers, no Si—O—Si bonds can be detected by infrared spectroscopy, as long as the copolymerization reaction was not carried out in highly acid or alkaline aqueous solution at elevated temperatures, e.g., over 100° C. If polymerization temperatures higher than 100° C. are necessary, the copolymerization can be carried out in the mass. In general, however, these extreme polymerization conditions, especially as regards the pH value, can be avoided by proper selection of an initiator for the polymerization. This also applies to the polymerization temperature. By the use of suitable redox systems, such as $H_2O_2$-ascorbic acid-iron sulfate, it is possible, in the case of vinyl, vinylidene and acrylic compounds, for example, to use for the copolymerization of the silanes of the invention polymerization temperatures lower than 0° C. (e.g., in an emulsion in mixtures of methanol and water). Low polymerization temperatures can be used in the copolymerization of the invention when metallic alkyls such as butyl lithium, triethyl aluminum, trimethyl boron and the like are employed as polymerization initiators.

The selection of the initiators depends primarily on the composition of the comonomers.

The copolymers that can be manufactured according to the present invention are true copolymers having Si—C bonds which are interconnected by C—C bonds. They have no Si—O—Si bonds in the macromolecule. They are thermoplastic and can be worked, for example, in extruders, deep drawing machines, rolling mills, etc.

The preparation of the organic silicon compounds used in accordance with the invention is described, for example, in copending U.S. patent application Ser. No. 758,193, filed Sept. 5, 1968, entitled, Unsaturated, Hydrolysis-Resistant Organic Silicon Compounds. The starting silanes according to this application are obtained for example by reacting a compound of the formula:

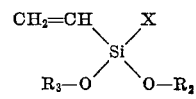

wherein $R_2$ and $R_3$ have the meaning given above and X represents halogen, with a tertiary alcohol or the corresponding alkali alcoholate. The reaction, which is conducted in the presence of basic condensing agents, is generally carried out by first dissolving the starting substances separately in a suitable solvent, and thereafter heating them to elevated temperatures, with the application of pressure, if desired.

STANDARD PROCEDURE 382 cc. of desalted water, 57 cc. of 1% (in water) Tylose MH50 (methyl cellulose), 1.32 g. of dilauroyl peroxide, 22 g. of freshly distilled vinyltrimethoxysilane and 198 g. of vinyl chloride were introduced into a one-liter glass autoclave which had been flooded with nitrogen. The polymerization mixture was stirred at 55° C. using a three-vane stirrer (500 r.p.m.). After 24 hours 179 g. of copolymer was obtained.

5 g. of this copolymer was boiled for 6 hours with 100 cc. of tetrahydrofuran under reflux. The insoluble fraction was filtered off, washed repeatedly with tetrahydrofuran, and dried at 50° C.

The combined tetrahydrofuran solutions were precipitated in methanol. The precipitate was collected and washed repeatedly with methanol and then dried at 50° C.

|  | G. |
|---|---|
| Yield of insoluble substance | 4.0 |
| Yield of soluble substance | 0.9 |

According to infrared spectroscopic examination, the soluble substance constitued pure PVC. Si—O bonds and small amounts of C=C bonds could be detected in the insoluble substance. No SiOH bonds were found to occur.

The following examples are given for the purpose of illustrating the invention; the examples, however, are in nowise to be considered as a limitation thereof.

Example 1

The procedure as set out immediately above was repeated but 22 g. of vinyltri-tert.-butoxysilane was used in place of the 22 g. of vinyltrimethoxysilane.

The yield after 24 hours of polymerization time amounted to 201 g.; Cl=50.5 percent; Si=1.0 percent; K value=55.5. The copolymer was entirely soluble in tetrahydrofuran, i.e., no cross-linking occurred during the copolymerization of the vinyltri-tert.-butoxysilane.

For infrared examination the copolymer was dissolved in tetrahydrofuran and then reprecipitated by the addition of methanol. In the infrared spectrum the characteristic bands of PVC and those of vinyltri-tert.-butoxysilane were found to occur, with the exception of the vinyl vibration. As under the above-stated polymerization conditions, the vinyltri-tert.-butoxysilane in any case forms oligomers (as shown by homopolymerization), and these are soluble in tetrahydrofuran-methanol, and produce vinyl bands in the infrared spectrum, it can be stated with certainty that the polymer described above in a true copolymer, although the tert.-butoxy groups produce a strong steric hindrance.

Example 2

50 g. of freshly distilled styrene, 5 g. of vinyltri-tert.-butoxysilane and 0.6 g. of benzoyl peroxide were heated under nitrogen for 20 hours at 80° C. A water-clear, solid copolymer was thereby formed. (Si=0.9 percent.)

A sample of this copolymer was dissolved in benzene and precipitated with methanol. Infrared analysis evidenced results similar to those described in Example 1. The percentage of silicon in the reprecipitated sample amounted to 0.9.

The reprecipitated sample was stirred in water for 24 hours at 60° C. The sample thus treated was soluble in benzene similarly to the original sample. This established that even subsequent treatment with water resulted in no cross-linking. Furthermore, no change could be detected in the sample on infrared spectroscopic analysis.

Similar results are achieved with other comonomers, such as for example, vinylidene chloride, acrylonitrile, acrylic esters, methacrylic esters, olefins, vinyl esters and the like. Suitable acrylic esters include acrylic acid methyl ester, acrylic acid ethyl ester, acrylic acid 2-ethyl-hexyl ester and acrylic acid n-dodecyl ester. Instances of suitable methacrylic esters include: methacrylomethylester, methacryl-2-ethylhexylester, methacryl-n-dodecyl ester, and the like. Suitable olefins are exemplified by: ethylene, propylene, isobutylene, etc., and suitable vinyl esters include: vinyl acetate, vinyl propionate and the like.

For the copolymerization, radical formers, ultraviolet light rays and ionic catalysts (including coordination catalysts) can be employed as catalysts, depending on the selection of the comonomers.

According to the present invention, by utilizing the vinyltrialkoxysilanes as proposed herein, it is possible to obtain non-cross-linked thermoplastic copolymers which, due to the inclusion of silicon in the molecule, evidence the properties known to be produced by such inclusion, such as, for example, water repellancy, lubricant properties in manufacture, etc.

What is claimed is:

1. In the process for the copolymerization of a vinyltrialkoxysilane with a monomer copolymerizable therewith wherein said monomer is copolymerized with the vinyl group of said silane which comprises contacting at least 0.1 weight percent, said alkoxysilane of the formula

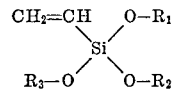

wherein $R_1$, $R_2$ and $R_3$ each represents an alkyl group with said monomer under polymerization conditions; the improvement which comprises providing the alkoxy groups of said siloxane where said R groups are each

and wherein A, B, and D are each alkyl.

2. Process according to claim 1 wherein said copolymerization is carried out in a water medium.

3. Process according to claim 2 wherein said copolymerization is carried out in a recation medium containing a solvent in addition to said water.

4. Process according to claim 1 wherein said copolymerization is carried out in suspension.

5. Process according to claim 1 wherein said copolymerization is carried out in emulsion.

6. Process according to claim 1 wherein said copolymerization is carried out in a slightly acid to slightly alkaline medium.

7. Process according to claim 6 wherein said copolymerization is carried out at a temperature below 100° C.

8. Process according to claim 1 wherein said vinyltri-tert.-alkoxysilane is used in an amount of 0.1 to 10% by weight of the total monomer content.

9. Process according to claim 1 wherein said vinyltri-tert.-alkoxysilane is used in an amount of 0.5 to 5% by weight of the total monomer content.

10. Process according to claim 1 wherein $R_1$, $R_2$ and $R_3$ taken together contain a total of 4 to 16 carbon atoms.

11. Process according to claim 1 wherein said comonomer is a member selected from the group consisting of vinylidene chloride, vinyl cholride, acrylonitrile, an acrylic ester, a methacrylic ester, an olefin, styrene and a vinylester.

12. A non-crosslinked thermoplastic copolymer of at least 0.1 weight percent of a siloxane of the formula:

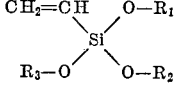

wherein said R groups are each tertiary alkyl groups, and an olefinically unsaturated monomer copolymerized with the vinyl group of said siloxane.

References Cited

UNITED STATES PATENTS

| | | | |
|---|---|---|---|
| 2,396,692 | 3/1946 | Garner | 260—80 PS |
| 2,532,583 | 12/1950 | Tyran | 260—80 PS |
| 3,278,476 | 10/1966 | Santelli | 260—80 PS |

FOREIGN PATENTS

| | | | |
|---|---|---|---|
| 868,188 | 5/1961 | Great Britain | 260—80 PS |

HARRY WONG, JR., Primary Examiner

U.S. Cl. X.R.

204—159.22; 260—30.4, 33.4, 33.6, 80, 80.3, 85.7, 86.1, 87.5, 87.7, 88.1